(12) United States Patent
Boriotti

(10) Patent No.: US 7,111,785 B2
(45) Date of Patent: Sep. 26, 2006

(54) COMPACT, OMNI-DIRECTIONAL SCAN PATTERN GENERATOR AND METHOD IN A READER FOR ELECTRO-OPTICALLY READING INDICIA

(75) Inventor: Joseph Boriotti, East Northport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 54 days.

(21) Appl. No.: 10/455,085

(22) Filed: Jun. 5, 2003

(65) Prior Publication Data
US 2004/0245340 A1   Dec. 9, 2004

(51) Int. Cl.
*G02B 26/00* (2006.01)

(52) U.S. Cl. .............................. 235/462.4; 235/462.38; 235/462.39

(58) Field of Classification Search ........... 235/462.01, 235/462.32, 462.36, 462.38, 462.39, 462.4, 235/462.43, 462.09
See application file for complete search history.

(56) References Cited

U.S. PATENT DOCUMENTS

| | | | | |
|---|---|---|---|---|
| 4,795,224 A | * | 1/1989 | Goto | ........................... 359/211 |
| 5,039,184 A | * | 8/1991 | Murakawa et al. | ......... 359/216 |
| 5,149,949 A | * | 9/1992 | Wike, Jr. | ................ 235/462.38 |
| 5,206,491 A | * | 4/1993 | Katoh et al. | ............. 235/462.4 |
| 5,268,565 A | * | 12/1993 | Katoh et al. | ........... 235/462.31 |
| 5,286,961 A | * | 2/1994 | Saegusa | .................... 235/462.4 |
| 5,314,631 A | * | 5/1994 | Katoh et al. | ............. 235/462.4 |
| 5,801,370 A | * | 9/1998 | Katoh et al. | ........... 235/462.01 |
| 5,818,025 A | * | 10/1998 | Gregerson et al. | ..... 235/462.35 |
| 5,837,988 A | * | 11/1998 | Bobba et al. | .......... 235/472.01 |
| 5,979,767 A | * | 11/1999 | Schonenberg et al. | . 235/462.35 |
| 6,188,500 B1 | * | 2/2001 | Rudeen et al. | .............. 359/196 |
| 6,237,851 B1 | * | 5/2001 | Detwiler | ................ 235/462.38 |
| 6,332,577 B1 | * | 12/2001 | Acosta et al. | .......... 235/472.01 |
| 6,631,844 B1 | * | 10/2003 | Ohkawa et al. | ........ 235/462.38 |
| 6,809,847 B1 | * | 10/2004 | McQueen | .................... 359/212 |

\* cited by examiner

*Primary Examiner*—Ahshik Kim
(74) *Attorney, Agent, or Firm*—Kirschstein et al.

(57) ABSTRACT

A compact, omni-directional scan pattern generator for generating multiple scan lines used for electro-optically reading bar code symbols includes stationary light-folding mirrors arranged at different elevations on a support, and a rotary mirrored component having a plurality of rotary mirrors for respectively reflecting an incident light beam toward the mirrors at each elevation.

3 Claims, 2 Drawing Sheets

COMPACT, OMNI-DIRECTIONAL SCAN PATTERN GENERATOR AND METHOD IN A READER FOR ELECTRO-OPTICALLY READING INDICIA

BACKGROUND OF THE INVENTION

1. Field of the Invention

The present invention generally relates to an electro-optical reader for reading indicia such as a bar code symbol and, more particularly, to a compact, scan pattern generator for generating an omni-directional scan pattern comprised of multiple scan lines, at least one of which is intended to sweep over a symbol associated with a target or product presented to the reader.

2. Description of the Related Art

Flat bed laser scanners, also known as slot scanners, have been used to electro-optically read bar code symbols, particularly of the Universal Produce Code (UPC) type, at a point-of-sale in supermarkets, warehouse clubs, department stores and other kinds of retailers for many years. One kind of slot scanner has a single, horizontal window set flush with, and built into, a countertop of a checkout station. Products to be purchased bear an identifying symbol and are slid across the horizontal window through which a multitude of scan lines is projected in a generally upwards direction. The scan lines are generated by a scan pattern generator which is designed to scan a symbol on a bottom side and/or a leading vertical side of each product presented to the horizontal window.

Another type of slot scanner has two built-in windows, one is horizontal as described above, and the other is vertical and positioned adjacent the horizontal window. Additional scan lines are projected through the vertical window to scan additional vertical sides of each product presented, thereby minimizing the need for a checkout clerk to visually locate the symbol on each product and rotate the product to a specific location where the symbol is best positioned to be read.

Still other types of scanners capable of generating multiple scan lines are portable units, either hand-held during reading, or placed on a countertop to serve as a workstation. The portable units have windows which are aimable at the symbol to be read and are more versatile than built-in installations.

As exemplified by U.S. Pat. No. 5,059,779; U.S. Pat. No. 5,124,539 and U.S. Pat. No. 5,200,599, the known scan pattern generators generate the scan lines in complex patterns of intersecting lines for superposition over the symbol to be read to insure that, no matter what the angular orientation of a respective symbol might be within predetermined limits, at least one of the scan lines or part of the pattern will be scanned over the entire length of the respective symbol.

FIG. 1 depicts a known scan pattern generator 10 in accordance with the prior art, in which a laser 12 emits a laser beam at a mirrored component 14 mounted on a shaft 16 for rotation by a motor 18 about an axis 20 in direction of the arrow 22. The component 14 has a plurality of flat main mirrors 30, 32, 34, 36 (as shown, four) and is known as a mirrored polygon. Each main mirror is tilted relative to the axis 20. A plurality of side mirrors 40, 42, 44, 46, 48 (as shown, five) is arranged about the axis 20.

During rotation of the polygon, a portion of the main mirror 30 adjacent its leading edge 50 reflects an incident light beam from the laser 12 onto side mirror 40 for reflection therefrom to the symbol. As main mirror 30 turns, the incident beam from the laser is successively reflected onto side mirrors 42, 44, 46, 48 until the trailing edge 52 clears the laser beam. The main mirror 30 thus generates a set of five scan lines. Similarly, each successive main mirror 32, 34, 36 generates a respective set of five scan lines. The overall scan pattern consists of four sets of five scan lines each. The length of each scan line depends on the length of each mirror. The angle of inclination of each mirror determines the extent to which the scan lines intersect one another and their relative orientation.

Although generally satisfactory for their intended purpose, the known scan pattern generators have a small number of scan line orientations, thereby limiting their performance especially on height-truncated symbols. To increase the number of scan line orientations, additional space is required to accommodate additional side mirrors. However, additional space is not readily available in hand-held portable units. The number of side mirrors could be increased by making each side mirror shorter in length; however, this would decrease scan line length and compromise performance.

SUMMARY OF THE INVENTION

Objects of the Invention

One object of this invention is to advance the state of the art of electro-optical readers.

Another object of this invention is to increase the number of scan lines generated by such readers without sacrificing performance and/or requiring additional space usage.

Still another object of this invention is to create omni-directional scan patterns of high scan line density to increase the likelihood that an indicia of random orientation will be read.

Features of the Invention

In keeping with these objects and others which will become apparent hereinafter, one feature of this invention, briefly stated, resides in an arrangement for, and a method of, generating an omni-directional scan pattern in a reader for electro-optically reading indicia, such as bar code symbols, by mounting a first plurality of stationary folding mirrors on a support above a base and about an axis perpendicular to the base, and by mounting a second plurality of stationary folding mirrors on the support above the first plurality of mirrors and about the same axis.

A first rotary mirror and a second rotary mirror are rotated by a drive about the axis. The first rotary mirror is tilted to reflect incident light thereon from a light source to the first plurality of folding mirrors for reflection therefrom to a symbol to be read. The second rotary member is tilted to reflect incident light thereon from the light source to the second plurality of folding mirrors for reflection therefrom to the symbol. The first and second rotary mirrors are preferably mounted on, or integral with, a common rotary component. Additional first and second rotary mirrors can be provided on the rotary component to generate additional scan lines.

The invention proposes the use of the first plurality of stationary mirrors at one level or lower elevation on the support, and the use of the second plurality of stationary mirrors at another level or higher elevation on the support. This dual-level arrangement allows more scan line orientations with minimal or no increase in space usage. the space savings is accomplished by reducing the heights of the single level mirrors of the prior art, to make room available for another level of mirrors in accordance with this invention. Of course, three of more levels of stationary mirrors could be used. The number of scan angles for the exiting beam and/or the length of each scan line can also be increased, both of which are desirable for an omni-directional reader.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 2:
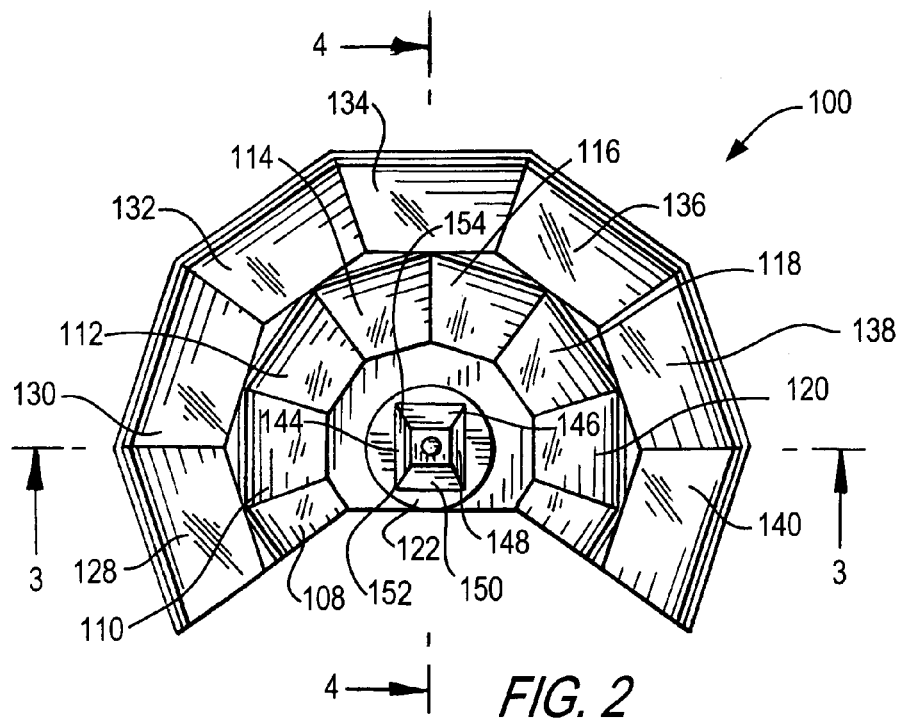
FIG. 2 is a top plan view of an omni-directional scan pattern generator in accordance with the invention.
Figure 3:
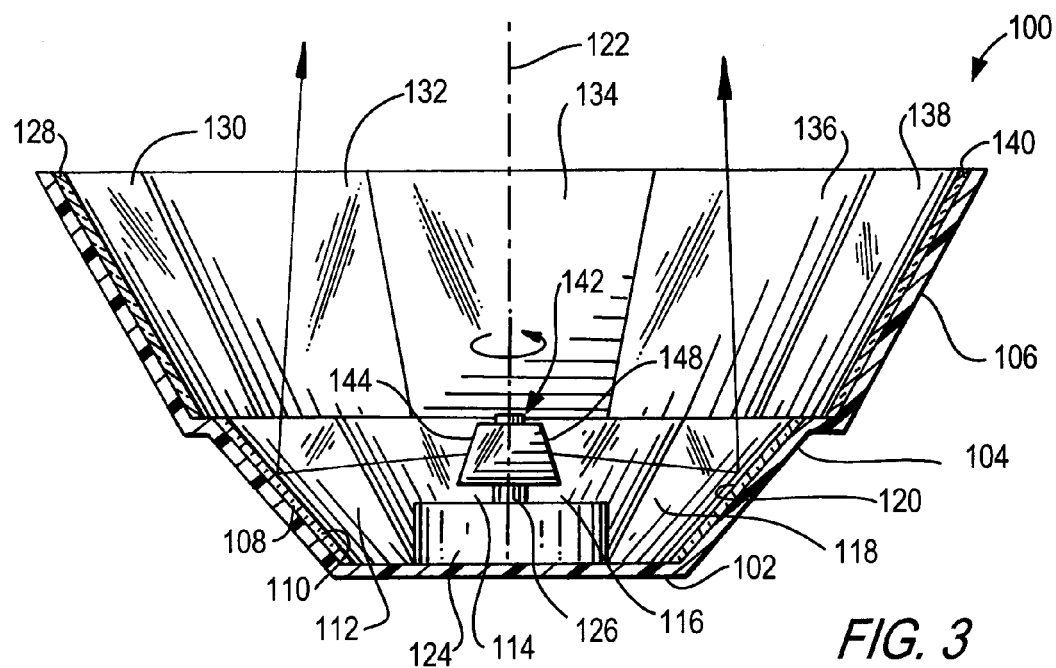
FIG. 3 is a sectional view taken on line 3—3 of FIG. 2.
Figure 4:
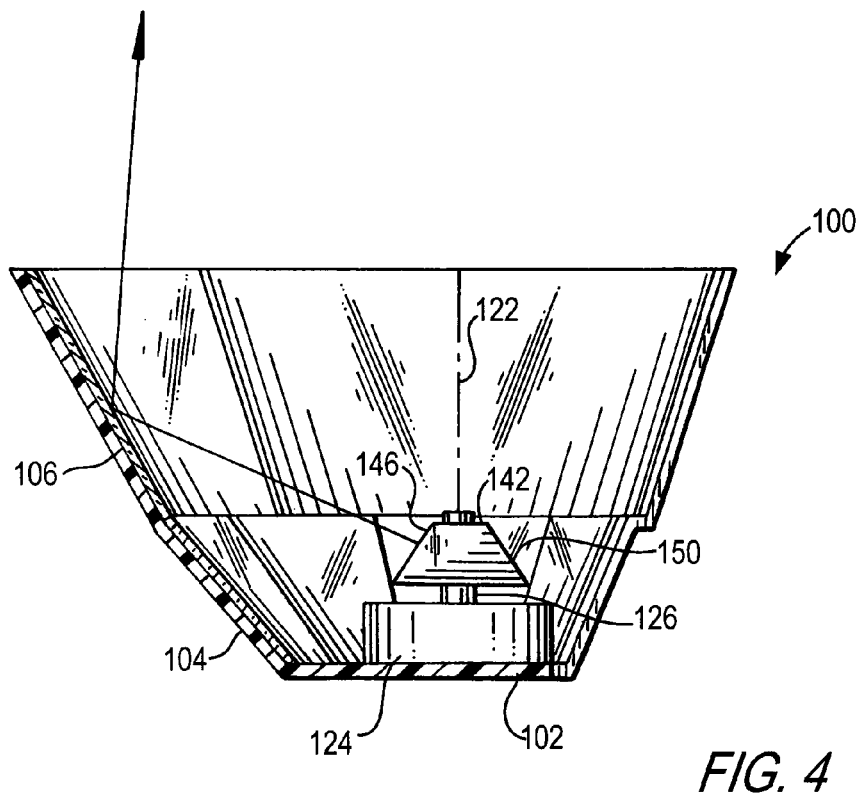
FIG. 4 is a sectional view taken on line 4—4 of FIG. 2.

Turning now to FIGS. 2–4, reference numeral 100 generally identifies a compact arrangement for generating an omni-directional scan pattern in a reader of the type disclosed by the above-identified patents, the contents of which are hereby incorporated herein by reference thereto, for electro-optically reading indicia, such as bar code symbols, both one- and two-dimensional.

Arrangement 100 includes a crown-like support having a planar base 102, a first plurality of support walls 104 at a first lower level or elevation relative to the base 102, and a second plurality of support walls 106 at a second upper level or elevation relative to the base.

A first plurality of stationary light-folding side mirrors 108, 110, 112, 114, 116, 118, 120 is mounted on the support walls 104 at the first lower level and is arranged about an axis 122 perpendicular to the base 102. A second plurality of stationary light-folding side mirrors 128, 130, 132, 134, 136, 138, 140 is mounted on the support walls 106 at the second upper level and is arranged about the axis 122. Each side mirror is planar and tilted at different angles of inclination relative to the axis 122. Although seven mirrors are depicted for each plurality of side mirrors, more or fewer side mirrors could be employed. Each side mirror need not be rectangular as illustrated, but could have other shapes.

Each plurality of side mirrors is arranged circumferentially along an incomplete annular path over an arcuate distance less than 360°; although the path could in come cases be a complete annulus. Preferably, the side mirrors of each plurality have the same length and are equiangularly distributed as considered along the arcuate path, but could also have different lengths. Each side mirror is tilted at an angle of inclination relative to the axis 122. The side mirrors of each plurality can have the same inclination angle or different inclination angles. The side mirrors of the first plurality can have the same inclination angle or different inclination angles as compared to the second plurality. The side mirrors of the second plurality are preferably circumferentially staggered relative to the first plurality, that is, the mirrors of each plurality are offset such that each mirror of the first plurality spans two adjacent mirrors of the second plurality.

Although the crown-shaped support is depicted with walls 104, 106 at two levels, it is also contemplated that more than two levels of support walls could be provided, together with an additional plurality of side mirrors at each level.

Figure 1:
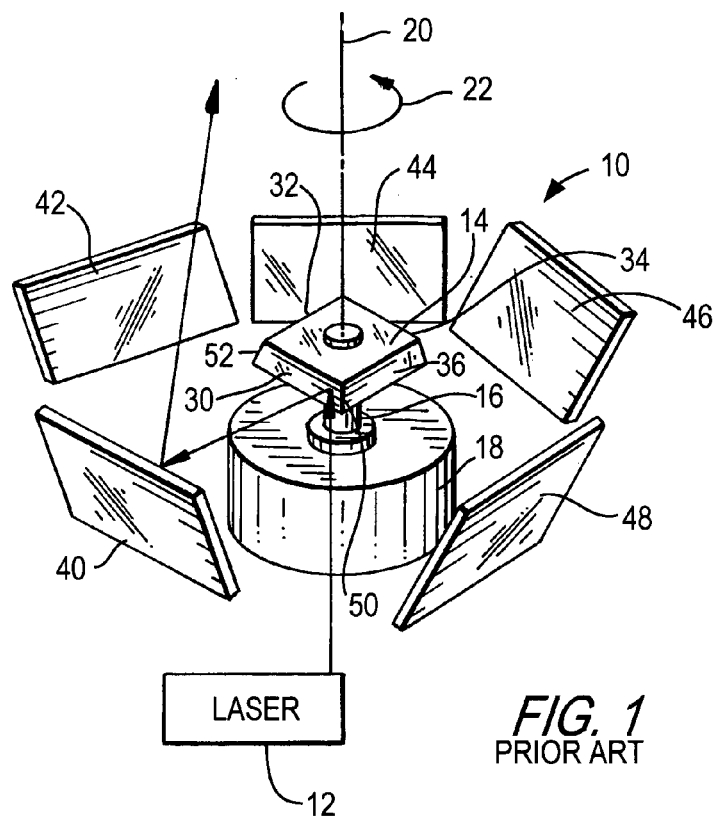
FIG. 1 is a perspective view of an omni-directional scan pattern generator in accordance with the prior art.

A drive, preferably an electrical motor 124, has a drive shaft 126 extending along axis 122. An optical component 142 is mounted on the shaft 126 and is turned about the axis 122 by the motor. The component 142 has rotary main mirrors 144, 146, 148, 150 at its periphery. The component 142 is preferably a molded frusto-pyramidal block having four outer planar walls on which planar mirrors are mounted, or on which a specular coating of light-reflecting material is applied to serve as the planar mirrors. The two rotary mirrors 144, 148, as best seen in FIG. 3, are tilted relative to the axis 122 at a first angle of inclination such that a light beam incident thereon, as from the laser source 12 in FIG. 1, is reflected downwardly toward the lower or first level of stationary mirrors. The two rotary mirrors 146, 150, as best seen in FIG. 4, are tilted relative to the axis 122 at a second angle of inclination, different from the first inclination angle, such that the incident light beam from the laser 12 is reflected upwardly toward the upper or second level of stationary mirrors.

More specifically, during rotation of the component 142, a portion of the main mirror 144 adjacent its leading edge 152 reflects the incident light beam onto lower side mirror 108 and, in succession, onto lower side mirrors 110, 112, 114, 116, 118, 120 until its trailing edge 154 clears the incident light beam, thereby generating seven scan lines. Next, a portion of the main mirror 146 adjacent its leading edge reflects the incident light beam onto upper side mirror 128 and, in succession, onto upper side mirrors 130, 132, 134, 136, 138, 140, thereby generating seven more scan lines. Thereupon, the main mirror 148 in a manner analogous to mirror 144 generates seven more scan lines. Finally, the main mirror 150 in a manner analogous to mirror 146 generates seven more scan lines. Each rotation of the component 142 generates four sets of seven scan lines each.

This invention envisions that more or fewer than four main rotary mirrors could be employed, and that each main mirror need not be trapezoidal as shown. The mirrors 144, 148 facing the lower level need not alternate with the mirrors 146, 150 facing the upper level. Instead of being arranged along the circumferential direction, the mirrors 144, 148, for example, could be axially spaced apart along the shaft and operative to simultaneously reflect the incident light beam toward the upper and lower level side mirrors during rotation.

It will be understood that each of the elements described above, or two or more together, also may find a useful application in other types of constructions differing from the types described above.

While the invention has been illustrated and described as embodied in a compact, omni-directional scan pattern generator and method in a reader for electro-optically reading indicia, it is not intended to be limited to the details shown, since various modifications and structural changes may be made without departing in any way from the spirit of the present invention.

For example, the reader can be a hand-held unit, a portable workstation, or a built-in, fixed installation. Also, the mirrors of the rotary component need not be permanently fixed in position on the component, but could be adjustably mounted thereon, for example, by turning a threaded element to position each mirror to a desired angle of inclination.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. An arrangement for generating an omni-directional scan pattern in a reader for electro-optically reading indicia, comprising:
    a) a support crown having a planar base, a first plurality of inclined support walls at a first elevation relative to the base, and a second plurality of inclined support walls at a second elevation larger than the first elevation relative to the base;
    b) a first plurality of stationary folding mirrors mounted on the first plurality of support walls above the base and circumferentially arranged about an axis perpendicular to the base;
    c) a second plurality of stationary folding mirrors mounted on the second plurality of support walls above the first plurality of mirrors and circumferentially arranged about the axis, the second plurality of mirrors being circumferentially staggered relative to the first plurality of mirrors, each mirror of the first plurality spanning two mirrors of the second plurality;
    d) a first rotary mirror mounted at a first angle of inclination on and rotatable about the axis and operative for reflecting a light beam incident thereon only toward each of the first plurality of mirrors in succession for reflection therefrom as a first set of scan lines;
    e) a second rotary mirror mounted at a second angle of inclination on and rotatable about the axis and operative for reflecting the light beam incident thereon only toward each of the second plurality of mirrors in succession for reflection therefrom as a second set of scan lines, the first and second rotary mirrors being successively arranged circumferentially about the axis, the angles of inclination being different; and
    f) a drive mounted on the base for rotating the first and second rotary mirrors about the axis to generate the first and second sets of scan lines on and across the indicia during rotation.

2. The arrangement of claim 1, wherein the first and second rotary mirrors are mounted on a shaft extending along the axis and are successively arranged circumferentially about the shaft.

3. The arrangement of claim 2, and further comprising an additional first rotary mirror and an additional second rotary mirror also mounted on the shaft, each of the first and second rotary mirrors being mounted on a common component.

* * * * *